US012665748B2

(12) United States Patent　　　　　　(10) Patent No.:　US 12,665,748 B2
Nickchen et al.　　　　　　　　　　　　(45) Date of Patent:　Jun. 23, 2026

(54) METHOD, COMPUTER PROGRAM AND SYSTEM FOR COLLECTING CONFIDENTIAL DATA FROM SEVERAL DATA PROVIDERS, FOR JOINT ANALYSIS OF SAID DATA

(71) Applicant: BULL SAS, Les Clayes-sous-Bois (FR)

(72) Inventors: Tobias Nickchen, Paderborn (DE); Waleed Ahmed, Stuttgart (DE); Olaf Badstübner, Butzbach (DE); Christian Schmidt, Bochum (DE)

(73) Assignee: BULL SAS, Les Clayes-sous-Bois (FR)

( * ) Notice: Subject to any disclaimer, the term of this patent is extended or adjusted under 35 U.S.C. 154(b) by 56 days.

(21) Appl. No.: 18/822,996

(22) Filed: Sep. 3, 2024

(65) Prior Publication Data

US 2025/0080327 A1　　Mar. 6, 2025

(30) Foreign Application Priority Data

Sep. 4, 2023　(EP) ..................................... 23195069

(51) Int. Cl.
*H04L 9/08*　　　(2006.01)
*G06F 21/62*　　(2013.01)
*H04L 9/40*　　　(2022.01)

(52) U.S. Cl.
CPC ............ *H04L 9/0822* (2013.01); *H04L 9/083* (2013.01); *G06F 21/6254* (2013.01); *H04L 63/0428* (2013.01)

(58) Field of Classification Search
CPC ... H04L 9/0822; H04L 9/083; H04L 63/0428; G06F 21/6254
See application file for complete search history.

(56) References Cited

U.S. PATENT DOCUMENTS 7,974,924 B2 * 7/2011 Holla ........................ H04L 9/14
　　　　　　　　　　　　　　　　　　　　　705/51
2008/0021730 A1 * 1/2008 Holla ..................... G16H 80/00
　　　　　　　　　　　　　　　　　　　　　705/2

(Continued)

FOREIGN PATENT DOCUMENTS

CN　　　110022309　　　7/2019
CN　　　114860890　　　8/2022

OTHER PUBLICATIONS

European Search Report and Written Opinion issued in EP23195069 issued on Jan. 19, 2024.

*Primary Examiner* — Ellen Tran
(74) *Attorney, Agent, or Firm* — ARC IP Law, PC; Joseph J. Mayo

(57) ABSTRACT

The invention relates to a method for pooling and analyzing datasets from data providers. The method includes, at the level of each data provider, for each dataset, a first encryption of each variable of the dataset with a first encryption key common to all data providers, and a second encryption of at least each variable of the dataset with a second encryption key specific to the each data provider and shared with an intermediary. The method also includes, at the level of the intermediary, for each encrypted dataset, decryption of the variables with the second encryption key, and a third encryption of each confidential variable with a third encryption key. The method also includes transmission of the datasets encrypted with the third encryption key to an analysis environment for analysis. It also relates to a computer program and a system for implementing such a method.

14 Claims, 3 Drawing Sheets

(56) References Cited

U.S. PATENT DOCUMENTS

| 2016/0275309 A1* | 9/2016 | Austin | .............. G06F 21/6254 |
|---|---|---|---|
| 2021/0168124 A1 | 6/2021 | Suter et al. | |
| 2023/0229652 A1* | 7/2023 | Plush | ...................... G06F 7/14 |
| | | | 707/691 |

* cited by examiner

| 102 | 104 | 106 | 108 | 110 | 112 |
|-----|-----|-----|-----|-----|-----|

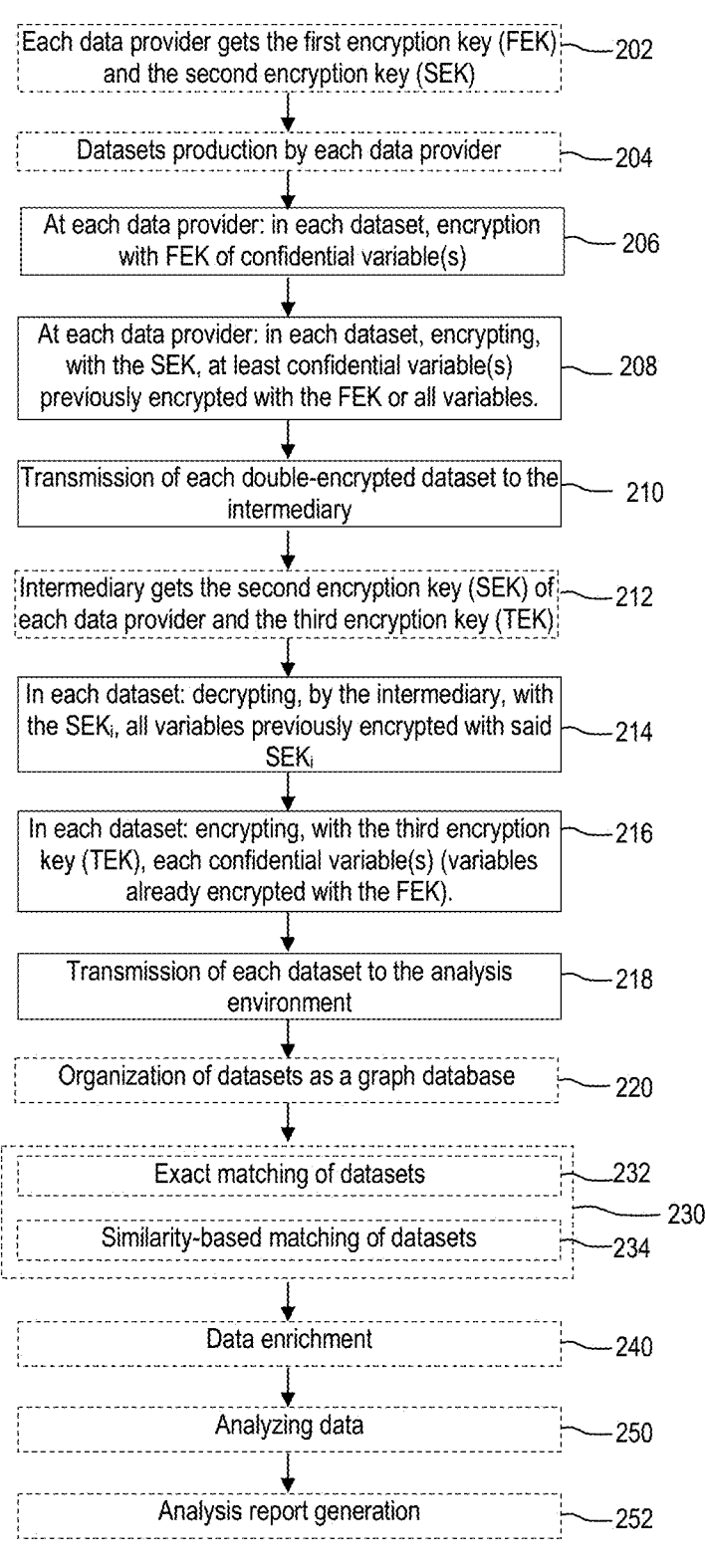

Each data provider gets the first encryption key (FEK) and the second encryption key (SEK) —202

Datasets production by each data provider —204

At each data provider: in each dataset, encryption with FEK of confidential variable(s) —206

At each data provider: in each dataset, encrypting, with the SEK, at least confidential variable(s) previously encrypted with the FEK or all variables. —208

Transmission of each double-encrypted dataset to the intermediary —210

Intermediary gets the second encryption key (SEK) of each data provider and the third encryption key (TEK) —212

In each dataset: decrypting, by the intermediary, with the SEK$_i$, all variables previously encrypted with said SEK$_i$ —214

In each dataset: encrypting, with the third encryption key (TEK), each confidential variable(s) (variables already encrypted with the FEK). —216

Transmission of each dataset to the analysis environment —218

Organization of datasets as a graph database —220

Exact matching of datasets —232

Similarity-based matching of datasets —234

—230

Data enrichment —240

Analyzing data —250

Analysis report generation —252

METHOD, COMPUTER PROGRAM AND SYSTEM FOR COLLECTING CONFIDENTIAL DATA FROM SEVERAL DATA PROVIDERS, FOR JOINT ANALYSIS OF SAID DATA

This application claims priority to European Patent Application Number 23195069.2, filed 4 Sep. 2023, the specification of which is hereby incorporated herein by reference.

BACKGROUND OF THE INVENTION

Field of the Invention

At least one embodiment of the invention relates to a method for collecting confidential data from several data providers, for joint analysis of data collected from said several data providers. At least one embodiment of the invention also concerns a computer program and a system for implementing such a method.

The field of the invention is of data collecting from several data sources, or data providers, for analyzing said data. More particularly, the field of the invention is collecting and analyzing confidential data from several data sources, or data providers, while keeping confidentiality of said data.

Description of the Related Art

The processing of large amounts of data is becoming increasingly relevant in many areas in order to deal with problems of various kinds and in various domains. In a networked world, the requirement for data from different sources to be processed jointly is becoming more and more frequent. This means that data must be shared e.g. across companies, authorities or country boundaries, and more generally between data sources/providers.

The sharing of data between data providers, or with a central analysis platform, becomes problematic when it involves sensitive data such as personal data or Personally Identifiable Information (PII), especially in domains such as healthcare, finance, public services, etc. Indeed, the need for joint analysis requires data sharing, while the requirement of confidentiality and data privacy requires not sharing said data and keeping it in the environment where said data is produced.

There is currently no effective solution that allows sharing and analyzing data, while preserving the confidentiality of at least the sensitive parts of said data.

A purpose of at least one embodiment of the invention is to overcome at least one of these drawbacks.

Another purpose of at least one embodiment of the invention is to propose a solution that allows sharing and analyzing data, while preserving the confidentiality of at least the sensitive/confidential parts of said data.

It is also a purpose of at least one embodiment of the invention to provide an easy to implement and cost-effective solution that allows data collaboration and analyzing data, while preserving confidentiality of said data.

BRIEF SUMMARY OF THE INVENTION

One or more embodiments of the invention makes it possible to achieve at least one of the aforementioned aims by a computer implemented method for collecting datasets from several data providers, for joint analysis of all datasets in an analysis environment, each dataset comprising several variables relating to an entity, at least one of said variables being confidential, said method comprising:

at the level of each data provider, for each dataset originating from said data provider:
- a first encryption of each confidential variable in said dataset with a first encryption key common to all data providers, and
- a second encryption of at least each confidential variable with a second encryption key specific to said data provider and shared with an intermediary;

transmission of the datasets obtained after second encryption to said intermediary;

at the level of said intermediary, for each received encrypted dataset:
- decryption of each variable previously encrypted with said encryption key ($SEK_1$-$SEK_n$), and
- third encryption of each confidential variable with a third encryption key; and transmission of the datasets obtained after third encryption to the analysis environment for data analysis.

At least one embodiment of the invention allows data collaboration originating from different data providers while preserving the confidentiality of sensitive data. Indeed, data originating from each data provider is first double encrypted at the level of said data provider, so that sensitive/confidential data leaves said data provider in a double-encrypted form (encryption at the source) and is received by the intermediary in said double-encrypted form. The intermediary then decrypts only one of the two encryptions applied to the received data and applies a third encryption to said confidential data. Sensitive data shared with the analysis platform is also double-encrypted data with the first and the third encryption keys. Thus, except the data provider itself, none of the parties involved in the data sharing and analysis process has access to raw/decrypted confidential/sensitive data.

Plus, at least one embodiment of the invention allows analysis of data originating from several data providers or data sources, while the sensitive/confidential data, especially personal identifiable information (PII) stays protected. Indeed, the analysis platform receives confidential variables encrypted with two encryption keys, i.e. the first and third encryption keys. Thanks to this encryption process, the analysis platform is able to analyze the created datasets, while the stays protected. The confidential/sensitive data/variables remains encrypted and does not need to be decrypted for analysis.

Moreover, the solution proposed by at least one embodiment of the invention is based on the use of encryptions techniques. The architecture of the data providers remains roughly the same. Existing analysis modules may be used for analyzing the encrypted data. Thus, the solution proposed by at least one embodiment of the invention is easy to implement and cost effective.

The analysis environment is a computerized environment. The environment may be hosted on one or several devices, such as a computer, a server, etc. The analysis environment may be a computerized platform. The analysis environment may be, or may be hosted, in a local network. Alternatively, the analysis environment may be hosted in the cloud, or in a virtual network. The analysis environment may be hosted on at least one physical machine and/or on at least one virtual machine.

Each data provider has a computing environment, such as a computer network, the architecture of which may be identical or different from the one of another data provider. The computing environment of a data provider may be a local network, a virtual network, etc. Data originating from a data provider may be located in said computer environment. In the present document, a step/operation is executed at the level of a data provider when said step/operation is executed in the computing environment of said data provider.

In at least one embodiment of the invention, a "data provider" may be an entity collecting data from several data sources and providing said collected data. Alternatively, a "data provider" may also be a data source, and in particular a single data source. According to a non-limitative example, at least one embodiment of the invention may be used to connect together several data sources of a company for joint analysis of data collected from said data sources.

In one or more embodiments, an "entity" may be a physical entity in the real world, such as a person, an animal, a vehicle, a device, etc. An "entity" may also be a group of several physical entities, such as those indicated above. An "entity" may also be a digital object only represented by digital data in a computing environment such as a computing node.

In at least one embodiment, by "confidential variable" it is meant an entity which represents a sensitive data that is meant to be kept confidential during data sharing and data analysis. Such a confidential variable may for example be a variable representing/relating to the identity of the entity, the address of the entity, etc. Such a confidential variable may also be other variables such as health data, or location data.

According to at least one embodiment of the invention, each variable is qualified as being confidential, or not confidential, before the at least one embodiment of the invention is carried out, for example by the data provider. Thus, at least one embodiment of the invention does not decide if a variable is, or is not, confidential: this is indicated before the at least one embodiment of the invention is carried out and will be decided based on the relevant use case and domain for which the at least one embodiment of the invention will be used.

In at least one embodiment of the invention, for a given dataset comprising several variables, the encryption is applied to the variable itself and individually, and not to the dataset as a whole. Thus, "encrypted dataset" means a dataset comprising individually encrypted variables in combination with non-encrypted variables.

In at least one embodiment of the invention, by "iteration" it is meant every occurrence of data pooling from several data providers, for gathering data and analyzing said pooled data as a whole. In other words, data pooled within an iteration is analyzed together. Data pooled within two different iterations might be analyzed together as a whole, or separately for each iteration, depending on the use case and the encryption keys involved during data pooling. For example, if two different (data pooling and analyzing) iterations use the same first and third encryption keys, then data gathered during said two iterations might be analyzed together or separately. In the contrary, if two different (data pooling and analyzing) iterations use different first encryption keys, and/or different third encryption keys, then data gathered during said two iterations can not be analyzed together and should be analyzed separately.

As indicated above, for a given dataset, during the second encryption at least each confidential variable of said dataset, previously encrypted with the first encryption key, is encrypted with the second encryption key.

Optionally, for a given dataset, during the second encryption, each variable of said dataset may be encrypted with the second encryption key. In other words, the second encryption may encrypt:

each confidential variable of said dataset, knowing that said each confidential variable is previously encrypted with the first encryption key, and at least one, and in particular each, non confidential variable of said dataset, knowing that said non-confidential variable is not previously encrypted with the first encryption key.

In one or more embodiments, each dataset may be presented in the same manner, i.e. according to a same dataset model. In other words, each dataset may have the same variables, preferably in the same order. The production of each dataset is carried out at the level of each data provider. Thus, two datasets originating from two different data providers comprise the same variables in the same order.

Each dataset may preferably comprise at least one confidential variable and at least one non-confidential variable.

In one or more embodiments, the method may further comprise, before the data analysis, a step for gathering datasets relating to a same entity, based on at least one variable in each dataset.

Thus, datasets originating from several data providers and relating to the same entity are put together, allowing better data analysis. Indeed, several data providers may be in possession of data regarding one and the same entity. An effective analysis of the said entity, for example its relationship with other entities, its characteristics, may be better determined by analyzing all data relating to said entity.

The datasets relating to a same entity may be gathered in a dataset cluster associated to said entity.

According to a non limitative example, when the one or more embodiments of the invention is used for analyzing health data regarding individuals, such analysis may be more effective by gathering medical data originating from different health centers where a same individual has been treated.

According to another non limitative example, when the one or more embodiments of the invention is used for analyzing financial data regarding physical or legal entities, such analysis may be more effective by gathering financial data originating from different banks where a same entity has bank accounts.

According to yet another non limitative example, when the one or more embodiments of the invention is used for analyzing data regarding vehicles, such analysis may be more effective by gathering data originating from locations where each vehicle has undergone a maintenance operation.

Of course, the at least one embodiment of the invention is not limited to the examples above.

In one or more embodiments, the gathering step may comprise a step for identifying datasets relating to the same entity based on an exact matching of at least one identity variable in said datasets.

In this case, each dataset comprises one or several variables relating to the identity of the entity, such as the name of the entity, the address of the entity, etc.

The exact matching step compares the identity variables of a given dataset to identity variables of other datasets. When two datasets comprise the same identity variables they are matched together.

In one or more embodiments, the gathering step may comprise a step for identifying datasets relating to the same entity based on a similarity score between datasets.

Thus, at least one embodiment of the invention makes it possible to gather datasets relating to the same entity, despite slight differences in the identity variables. Such a slight difference may be an error in the spelling of the identity of the entity, or an intentional change due to a fraudulent behavior.

The similarity-based matching may be carried out as follows:

comparing a similarity score between a pair of datasets to a predetermined threshold, and if the similarity score is equal to, or above, said threshold, then said pair of datasets are considered to relate to the same entity.

In one or more embodiments, the method may further comprise a step for calculating a similarity score between two datasets, based on at least one identity variable in said datasets.

The similarity score may be calculated based on several, and in particular on all, variables in said datasets.

The similarity score between two datasets may be calculated in several ways.

According to an example, in at least one embodiment of the invention, a feature vector is determined for each dataset, for example by using a machine learning model previously trained for feature vector determination. Then a similarity, for example a cosine similarity or a Euclidean similarity, is calculated between said two vectors.

According to another example, in at least one embodiment of the invention, the datasets, or at least the identity variable(s) of two datasets are entered into a machine learning model previously trained for similarity score determination. The machine learning model then outputs a similarity score for the two datasets.

The machine learning model may for example be a neural network. Neural networks used for similarity score determination, or feature vector determination, are well known in the art.

As indicated above, the gathering step may gather the datasets relating to a same entity in a dataset cluster. Thus, at the end of the gathering step, there are as many clusters as different entities, each cluster being associated to an entity and comprising the datasets relating to said entity.

At least two datasets relating to the same entity and gathered during the gathering step may originate from the same data provider. Alternatively, or in addition, at least two datasets relating to the same entity and gathered during the gathering step may originate from different data providers.

The gathering step may be carried out on datasets obtained after the third encryption. Thus, the exact matching, and/or the similarity-based matching, is/are carried on the encrypted form of the variables contained in the datasets.

According to one or more embodiments of the invention, the first key is a key shared by all data providers. In other words, the first key used for the first encryption is common to all data providers.

Thus, the encrypted data obtained after the first encryption for a given variable having the same value will be the same, regardless data providers. Thus, it will be possible to work on the encrypted value of said variable, without decryption.

For example, if different datasets originating from different data providers has the same value for an identity variable, the encrypted identity variable will have the same value. It will thus be possible to process said variable, for example during the gathering step, without decrypting said identity variable. This applies to all variables in all datasets: if a given variable has the same value in datasets originating from different data providers, the encrypted data obtained for said variable after first encryption will be the same since all data providers use the same common first encryption key.

In one or more embodiments, the first encryption key may be a one time key. Thus, every time data is collected/pooled from data providers or data sources for analysis, the first key is changed. This provides a higher security level for data confidentiality and integrity. In this case, data pooled from several data providers during an iteration can not be analyzed with data pooled from said data providers during another iteration.

In one or more embodiments, the first encryption key may be a multiple use key. Thus, the same first encryption key may be used for several iterations of data collection/pooling from data providers. This provides a less cumbersome implementation of the one or more embodiments of the invention. Plus, in this case, data pooled from several data providers during an iteration can be analyzed together with data pooled from said data providers during another iteration because the first encryption key is the same for said iterations.

In one or more embodiments, the second encryption key of at least one data provider may be a single use key. Thus, every time data is collected/pooled from a data provider, the second encryption key of said data provider is changed. This provides a higher security level for data confidentiality and integrity.

In one or more embodiments, the second encryption key of at least one data provider may be a multiple use key. Thus, the same second encryption key may be used for several iterations of data collection/pooling from said data provider. This provides a less cumbersome implementation of at least one embodiment of the invention.

In one or more embodiments, the third encryption key may be a single use key. Thus, the third encryption key is changed at every iteration of at least one embodiment of the invention. This provides better security for data confidentiality and integrity.

In one or more embodiments, the third encryption key may be a multiple use key. Thus, the same third encryption key may be used for several iterations of at least one embodiment of the invention. This provides a less cumbersome implementation of at least one embodiment of the invention.

In one or more embodiments, the third encryption key may be a homomorphic encryption key. In one or more embodiments, the third encryption key may be not be a homomorphic encryption key.

In one or more embodiments, at least one, in particular each, encryption key may be generated and provided by a trust center.

The trust center may be independent from each data provider, the intermediary and the analysis environment.

The trust center may for example be a server, or any other component or network configured to generate and keep the encryption keys. The trust center may implement a trusted key generation service or application.

The trust center has no access to datasets collected/pooled from the data providers.

Each data provider may request the first and the second encryption keys upon authentication, by any means of identification, for example by means of an authentication certificate. The authentication certificate may be individual to each data provider.

The intermediary may request each second and the third encryption keys upon authentication, by any means of authentication, for example by means of an authentication certificate. The authentication certificate may be individual to the intermediary.

The trust center may be located at level of a data provider, or at the level of the intermediary, or at the level of the analysis environment. Preferably, the trust center may be located autonomous from each data provider, the intermediary, and the analysis environment for a higher security level.

The trust center may be accessible for each data provider, respectively the intermediary, through a communication network, such as the Internet, using a secured wired or wireless connection.

In one or more embodiments, the method may further comprise, before data analysis, a step for representing datasets as a graph database, in which each node represents an entity.

In this case, the data analysis may be carried out using said graph database.

Of course, datasets may be organized differently for data analysis and at least one embodiment of the invention is not limited to a graph database. It can be any existing type of database.

In one or more embodiments, the method may further comprise, before data analysis, a step for enriching data with at least one predetermined algorithm, such as:

a centrality algorithm for providing an importance score to an entity, or an attribute, a community algorithm for providing an information regarding the clusters/neighborhood of the entities, and/or attributes, and/or graph embedding analysis algorithm for providing properties of an entity.

Data enrichment techniques are well known in the art, and thus will not be detailed here for sake of concision.

The data enrichment may be carried out based on datasets with the third encryption, meaning that all sensitive data, i.e. confidential variables, is/are encrypted.

The data enrichment may preferably be carried out in the analysis environment. Alternatively, data enrichment may be carried out at the level of another entity.

In one or more embodiments, the method may not comprise an analysis step for analyzing data.

In one or more embodiments, preferably, the method may further comprise an analyzing step for analyzing, in the analysis environment, the datasets with at least one analysis module.

The analyzing step processes the datasets with the third encryption. Thus, the analyzing step does not have access to raw sensitive data, i.e. to raw confidential variables. This is possible because in the datasets received by the analysis environment:

each confidential variable is encrypted with the first encryption key common to all data providers: this provides that same values for same variables are represented by the same encrypted data; and at least each confidential variable, previously encrypted with the first encrypted key, is also encrypted with the third encryption key on top of the encryption with the first encryption key: this allows processing of data without the need for having access to raw sensitive data.

The analyzing step may carry out any known processing operation such as filtering data, establishing statistics, organizing data according to predetermined rules, establishing relationship between entities, measuring data flows between entities, etc. all those processing/analyzing techniques are well known in the art and can be configured for different use cases and domains.

More generally, any analyzing technique/operation applicable to raw data may be applicable to the datasets, since only sensitive variables are protected while non-sensitive but predictive variables, can be used in their raw state.

The analysis of data may be carried out using at least one analysis module such as:

a mathematical calculation module a statistical analysis module a machine learning analysis module, a neural network analysis module, an artificial intelligence module, and/or a rule-based analysis module.

At least one of these modules may be used for analyzing tabular data or graph data.

In one or more embodiments, the method may comprise a step for generating an analysis report. Said analysis report may comprise raw data generated during the analyzing step, but also data, and more particularly variables, encrypted with the first and the third key.

The analysis report may be sent to the intermediary.

The intermediary may decrypt the encrypted variables with the third encryption key: at this stage the confidential variables are still encrypted with the first encryption key.

The intermediary may send the analysis to a data provider or a report consumer. Before sending the analysis report to a data provider, the intermediary may encrypt the variables with the second key specific to said data provider: at this stage the confidential variables are encrypted with the first key and second key.

The data provider receiving the analysis report decrypts the encrypted variables with the second key, and after with the first key. After this double decryption, the data provider has access to raw data regarding the variables used in the report and the analysis data generated during the analysis step.

According to at least one embodiment of the invention, it is proposed a non-transient computer program comprising instructions which, when executed by computing means, cause said computing means to carry out the method according to one or more embodiments of the invention.

The computer program may be in any programming language such as C, C++, JAVA, Python, etc.

The computer program may be in machine language.

The computer program may be stored, in at least one non-transient memory, such as a USB stick, a flash memory, a hard disk, a processor, a programmable electronic chip, etc.

The computer program may be stored in a computerized device such as a Smartphone, a tablet, a computer, a server, etc.

In one or more embodiments, the computer program may comprise several computer programs that are executed on separate computing means.

According to at least one embodiment of the invention, it is proposed a system comprising means configured for carrying out the method according to one or more embodiment of the invention.

The system may comprise, in at least one embodiment of the invention, at level of each data provider, an encryption/decryption module configured to carry out, for each dataset originating from said data provider:

a first encryption of each confidential variable of said dataset with a first encryption key common to all data providers, and a second encryption of at least each confidential variable of said dataset, with a second encryption key shared with an intermediary;

communication means configured to:

send/receive data to/from the intermediary, and obtain encryption keys from a trust center.

The system may also comprise, in at least one embodiment of the invention, at the level of the intermediary:

an encryption/decryption module configured to carry out, for each received dataset:

a decryption of each variable of said dataset previously encrypted with said second encryption key, and a third encryption of each confidential variable with a third encryption key; and communication means configured to:

send/receive data to/from each data provider, respectively the analysis environment, and obtain encryption keys from trust center.

The system may also comprise, in at least one embodiment of the invention, an analysis environment. The analysis environment may comprise at least one of:

a dataset gathering module configured for carrying out the gathering step as detailed above, a dataset enrichment module configured for carrying out the enrichment step as detailed above, at least one data analyzing module configured to analyze data, a report generation module configured to generate an analysis report, and communication means configured to send/receive data to/from the intermediary.

The system may also comprise, in at least one embodiment of the invention, a trust center for generating and providing at least one of the encryption keys described above.

BRIEF DESCRIPTION OF THE DRAWINGS

Other advantages and characteristics will become apparent on examination of the detailed description of one or more embodiments which is in no way limitative, and the attached figures, where:

FIG. 1 is a diagrammatic representation of a non-limitative example of a dataset that may be used in one or more embodiments of the invention, FIG. 2 is a diagrammatic representation of a non-limitative example of a method according to one or more embodiments of the invention.

DETAILED DESCRIPTION OF THE INVENTION

Figure 3:
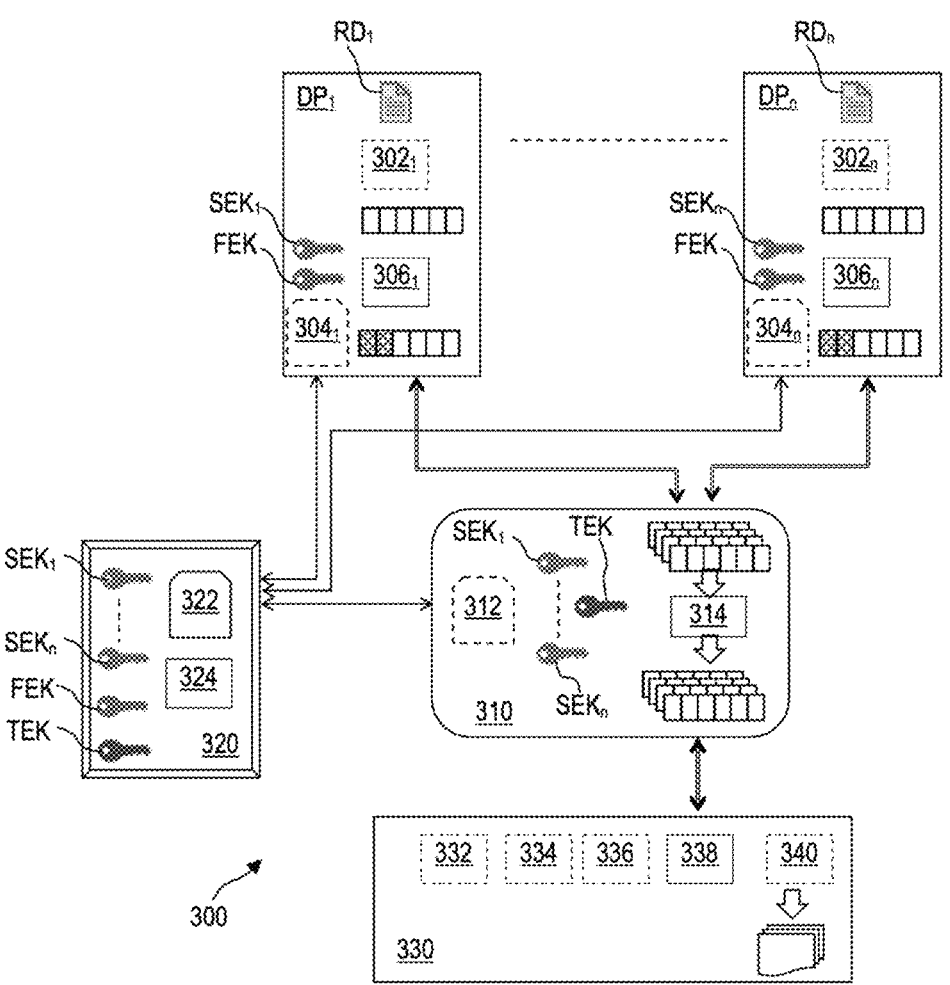
FIG. 3 is a diagrammatic representation of a non-limitative example of a system according to one or more embodiments of the invention.

It is well understood that the one or more embodiments that will be described below are in no way limitative. In particular, it is possible to imagine variants of the one or more embodiments of the invention comprising only a selection of the characteristics described hereinafter, in isolation from the other characteristics described, if this selection of characteristics is sufficient to confer a technical advantage or to differentiate the one or more embodiments of the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the FIGURES, elements common to several figures retain the same reference.

Figure 1:
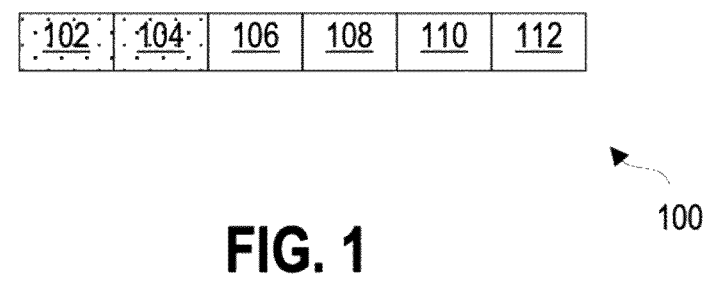

FIG. 1 is a diagrammatic representation of a non-limitative example of a dataset that may be used in one or more embodiments of the invention.

The dataset 100, shown in FIG. 1, relates to an entity that may a physical entity, or legal entity, in the real world. For example, the entity may be a person, an animal, a physical object such as a vehicle, a computer, a device, a sensor, etc. The entity may also be a combination of several physical entity or legal entities in the real world, for example a group of persons, a group companies, a town, a region comprising several towns, a group of vehicles, etc. The entity may also be a digital entity such as a computing node, a communication node, etc.

The dataset 100 comprises several variables, and more particularly, several values each for a given variable. In the non-limitative example shown in FIG. 1, the dataset comprises six variables.

The dataset 100 comprises at least one confidential variable, representing sensitive data. In the non-limitative example shown, the dataset comprises two confidential variables 102-104. The other variables, 106, 108, 110 and 112 are not confidential variables.

The confidential variables 102-104 may relate to the identity of the entity. For example, variable 102 may be the name of the entity, and the variable 104 may be the birthday of the entity, if the entity is a physical person.

The non confidential variables 106-112 may represent non confidential aspects of the entity. For example, variables 106-112 may represent medical data of the entity such as:

106: the name of a medical treatment applied to the entity,

108: the name of the medical center,

110: the duration of the medical treatment, and

112: the name of the medical expert involved during the treatment.

In another example, variables 106-112 may represent data regarding financial transactions relating to the entity such as:

106: the value of a bank transaction which has been transferred,

108: the timestamp of the said bank transaction,

110: the reason for the transaction,

112: the second reason, e.g. the sales ID of an online shop transaction.

Of course, these examples are in no way limitative.

The one or more embodiments of the invention may be applied for collecting and analyzing data in various domains, such as medical domain, financial domain, public domain, environmental domain, digital communications, cybersecurity, etc.

FIG. 2 is a diagrammatic representation of a non-limitative example of a method according to one or more embodiments the invention.

The method 200, shown in FIG. 2, may be used to collect and analyze data from several data providers, in various domains.

The method 200 comprises an optional step 202 during which each data provider request:

a first encryption key, FEK, and a second encryption key, SEK.

The FEK and the SEK may be requested from a trust center producing said FEK and said SEK.

If the data provider requests said keys from a trust center, first each data provider authenticates itself to the trust center by using authentication data. Authentication may be carried out with various authentication data, such as an authentication certificate. Authentication may also be carried out with and ID and a password, an authentication token, using IDAAS service, etc. After successful authentication, the trust center identifies the data provider as a data provider and provides the data provider with the FEK and the SEK.

In the non-limitative example described here, the FEK is common to all data providers. In other words, the first encryption key FEK is shared by all data providers.

In the non-limitative example described here, the SEK is specific for each data provider, and each data provider shares its SEK with the intermediary so that when said data provider encrypts a variable with said SEK, said intermediary is able to decrypt said variable with said SEK.

For at least one data provider, step 202 is optional because the encryption keys may be sent to the data provider before the method 200. Alternatively, the encryptions keys may be generated by the data provider itself. Other alternatives not mentioned here are also possible without departing from the scope of the one or more embodiments of the invention.

The method 200 comprises an optional step 204 during which each data provider produces the datasets to be analyzed. During this step, each data provider produces and presents each dataset according to a dataset model, provided to said data provider beforehand. For example, the dataset model may be the dataset 100 shown in FIG. 1, according to one or more embodiments of the invention.

This step 204 is optional for at least one data provider because the datasets may already exist according to the dataset model, for example because the datasets are produced by said data provider during operation exactly according to the dataset model.

According to at least one embodiment, the datasets may be presented according to different models for different data providers. In this case, step 202 is also optional.

After step 204, each data provider has one or several datasets to be analyzed. In each dataset, there is at least one confidential variable and optionally at least one non-confidential variable. Each variable represents information, and comprises data, relating to an entity: an identity of the entity, an activity of the entity, a characteristic/attribute of the entity, etc.

The method 200 comprises a step 206 realized at level of each data provider. In each dataset, the data provider encrypts each confidential variable with the first encryption key, FEK. It is recalled that the FEK is common to all data providers. Thus, if two different data providers encrypt the same value with the FEK, they will obtain the same encrypted data. It is recalled that the first encryption is applied to only confidential variable(s) in each dataset.

After step 206, in each dataset, each confidential variable is encrypted with the first key, at level of each data provider. Thus, step 206 produces first-encrypted dataset(s) comprising confidential variable(s) encrypted with the first encryption key. The non-confidential variable(s) of the dataset, if any, are not encrypted with the FEK.

The method 200 comprises a step 208 realized at level of each data provider, after step 206.

During this step, for each dataset, the data provider encrypts, with the second encryption key SEK, at least each confidential variable of said dataset, said each confidential variable being already encrypted with the FEK at step 206. Optionally, at least one, and in particular each, non-confidential variable of the dataset may also be encrypted with the second encryption key SEK.

It is recalled that the SEK is different for each data provider, and each data provider shares its SEK with the intermediary. Thus, when a data provider encrypts a variable with its SEK, the intermediary is able to decrypt this variable with said SEK. If there are "n" data providers, there are n second encryption keys.

After step 208, each confidential variable, previously encrypted with the FEK, is moreover encrypted the $SEK_i$, at level of each data provider i. Thus, step 208 produces dataset(s) in which each confidential variable is double-encrypted, and optionally each non-confidential variable is encrypted by the second encryption key SEK.

The method 200 comprises a step 210 transmitting, from each data provider to the intermediary, the double encrypted datasets over a wired or a wireless communication link. Datasets may be transmitted through a communication network, such as the Internet. Datasets may be transmitted through a network, such a physical network or a virtual private network (VPN). In all cases described above, the whole dataset is protected by state-of-the-art methods for encryption in transit.

At least one data provider may transmit dataset(s) to the intermediary. Alternatively, at least one data provider may transmit dataset(s) to a database from where the intermediary may collect/read/pool said dataset(s).

The method 200 also comprises an optional step 212 during which the intermediary requests:

the SEK used by each data provider, and a third encryption key, TEK.

The SEK and the TEK may be requested from the trust center producing said SEK and said TEK.

First the intermediary authenticates itself to the trust center by using authentication data. Authentication may be carried out with various authentication data/techniques, such as an authentication certificate, an ID with a password, an authentication token, directly or using an IDAAS service, etc. After successful authentication, the trust center identifies the intermediary and provides the latter with each SEK and the TEK.

Step 212 is optional because each SEK and the TEK may be sent to the data provider before the method 200. Alternatively, the TEK may be generated by the intermediary itself. Other alternatives not mentioned here are possible without departing from the scope of the one or more embodiments of the invention.

Of course, step 212 may be carried out before step 210, for example before, after or at the same time as step 202 or 204.

The method 200 comprises a step 214 during which the intermediary decrypts, in each data set, each variable previously encrypted during second encryption, with the $SEK_i$ associated to the data provider i from which said dataset originates. In other words, the intermediary reverses the second encryption applied by each data provider to the dataset(s) originating from said data provider.

After step 216, each confidential variable in each data set is still encrypted with the FEK. Thus, the intermediary has no access to raw data for the confidential variable(s).

Preferably, but without loss of generality, the intermediary does not store any data received from the data providers. At the intermediary the data may directly be loaded in-memory for the re-encryption and subsequently transmitted to the analysis environment. Therefore, there is no data persistence at the level of the intermediary.

The method 200 comprises a step 216, realized at level of the intermediary, on the datasets obtained at step 214.

During this step 216, the intermediary encrypts each confidential variable (still encrypted with the FEK) with the third encryption key, TEK.

It is recalled that the TEK is individual to the intermediary and is a non-shared key.

After step 216, for each dataset, each confidential variable of said dataset is encrypted with the first encryption key FEK and encrypted with the third encryption key TEK. Thus, step 216 produces dataset(s) in which confidential variable(s) is (are) double-encrypted with the FEK and then the TEK.

The datasets encrypted with the TEK are transmitted by the intermediary to an analysis environment at a step 218. Datasets may be transmitted through a communication network, such as the Internet. Datasets may be transmitted through a network, such a physical network or a virtual private network (VPN). In all cases described above, the whole dataset is protected by state-of-the-art methods for encryption in transit.

Preferably, but without loss of generality, dataset(s) may be transmitted directly to the analysis environment. Alternatively, dataset(s) may be stored in a database from where the analysis environment may collect/read/pool said dataset (s).

The method 200 may further comprise an optional step 220 for representing the datasets as a graph database, in which each node represents an entity.

The method 200 may comprise an optional step 230 for gathering datasets relating to each entity together.

The gathering step 230 may comprise an optional step 232 for gathering datasets belonging to the same entity, based on an exact matching. During this step, variables contained in the datasets, and especially variables relating to the identity of the entity, are compared. If two datasets comprise the same variables, and more specifically the same identity variables, then said two datasets are considered as belonging to the same entity.

Alternatively, or in addition, the gathering step 230 may comprise an optional step 234 for gathering datasets belonging to the same entity, based on a similarity score between datasets. During this step, datasets are considered by pairs: a similarity score is calculated for each pair of datasets, based on variables contained in each dataset, and especially variables relating to the identity of the entity. If two datasets have a similarity score equal to, or greater than, a predetermined similarity threshold, then said two datasets are considered as belonging to the same entity. In the contrary, it is considered that datasets belong to two different entities. For a pair of datasets, similarity score calculation may be done according to any known technique, for example using a machine learning model, such as a neural network, previously trained to do so.

The gathering step 230 may gather datasets relating to an entity in a dataset cluster associated to said entity. Thus, the gathering step 230 may provide as many clusters as there exist entities in all datasets.

The method 200 may comprise an optional step 240 for enriching data with at least one predetermined algorithm, such as:

- a centrality algorithm for providing an importance score to an entity, or an attribute,
- a community algorithm for providing an information regarding the clusters/neighborhood of the entities, and/or attributes, and/or
- graph embedding analysis algorithm for providing properties of an entity.

Data enrichment techniques are well known in the art, and thus will not be detailed here.

The method 200 may further comprise an optional step 250 for analyzing the datasets with at least one analysis module. The analyzing step 250 may perform one or several analysis of the dataset.

The analysis may be carried out using any known analyzing technique, for example by using at least one analysis module, such as:

- a statistical analysis module
- a machine learning analysis module,
- a neural network analysis module, and/or
- a rule-based analysis module.

At a step 252, after analysis of the datasets, optionally enriched during step 240, an analysis report may be generated. At least one analysis report may comprise raw data generated during the analysis step, but also at least one variable encrypted with the third key and/or at least one variable encrypted with the first encryption key FEK and third encryption key TEK.

The analysis report may be sent to the intermediary. The intermediary may decrypt the encrypted confidential variables with the third key, if any: at this stage the confidential variables in the report, if any, are still encrypted with the first key. The intermediary may encrypt the whole report with the $SEK_i$ associated to a data provider i and send said encrypted report to said data provider i. The latter may then decrypt the report with said $SEK_i$, and the confidential variables with the FEK. At this point, data provider i has access to all raw data in said report.

Of course, in one or more embodiments, the method may not comprise the option steps, or comprise only some of the optional steps.

FIG. 3 is a diagrammatic representation of a non-limitative example of a system according to one or more embodiments of the invention.

The system 300, shown in FIG. 3, may be used to carry out a method according to one or more embodiments of the invention, and in particular the method 200 of FIG. 2.

The system 300 is used to collect data from several data providers, and analyze all collected data, while preserving confidentiality of data during the whole process. In the example represented in FIG. 3, the system 300 is used to collect data from n data providers, referenced respectively $DP_1$-$DP_n$. Each data provider may be a server, a sensor, a computer network, a medical center, etc. The collected data may be medical data, financial data, environmental data, traffic data, marine data, data relating to cybersecurity of network, etc.

Each data provider $DP_1$-$DP_n$ produces/comprises raw data, respectively $RD_1$-$RD_n$, relating to one or several entities. For each entity, the raw data may be data regarding the activity of said entity, the behavior of said entity, the characteristics of said entity, etc.

Optionally, the system 300 may comprise in the environment of, or at the level of, each data provider $DP_1$-$DP_n$, a module, respectively $302_1$-$302_n$, for formatting/presenting row data according to a dataset model. The dataset model indicates which variables should be indicated in the dataset, and the order of the variables. The dataset model may also indicate which variable is a confidential/sensitive variable, and which variable is not confidential/sensitive.

The module $302_i$ reads variables in the raw data $RD_i$ and writes said variables in at least one dataset according to the dataset model. According to a non limitative example, each module $302_i$ is configured/programmed to carry out the optional step 204 of the method 200.

At this stage, all variables in each dataset produced by the module $302_i$ corresponds to raw data.

The system 300 may comprise in the environment of, or at the level of, each data provider $DP_1$-$DP_n$, an optional module, respectively $304_1$-$304_n$, for authentication said data provider $DP_i$ before a trust center and obtain:

the first encryption key, FEK, common to all data providers $DP_1$-$DP_n$, and the second encryption key, $SEK_1$-$SEK_n$, that is different for each data provider $DP_1$-$DP_n$, and that each data provider $DP_1$-$DP_n$ shares with an intermediary.

The module 304; provides authentication data, such as an authentication certificate or token, to the trust center for authenticating said data provider $DP_i$. Once the data provider $DP_i$ is authenticated and identified as a data provider, the trust center transmits the FEK and the $SEK_i$ to said $DP_i$.

According to a non limitative example, each module $304_i$ is configured/programmed to carry out the optional step 202 of method 200, according to one or more embodiments of the invention.

The system 300 comprises in the environment of, or at the level of, each data provider $DP_1$-$DP_n$, an encryption/decryption module, respectively $306_1$-$306_n$, for:

first, encrypting each confidential variable of each dataset with the FEK common to all data providers $DP_1$-$DP_n$, and then, encrypting at least each confidential variable of each dataset (variable(s) already encrypted with the FEK), and optionally non-confidential variable(s), with the $SEK_i$ specific to said data provider $DP_i$.

According to a non-limitative example, each module 306; is configured/programmed to carry out steps 206-208 of the method 200, according to one or more embodiments of the invention.

After encryption of the variables with the $SEK_i$, each dataset encrypted is ready to be communicated to the intermediary.

The system 300 comprises an intermediary 310 for receiving, from all data providers $DP_1$-$DP_n$, the datasets with encrypted variables.

The system 300 comprises, in the environment of, or at the level of, the intermediary 310, an optional module 312 for authentication said intermediary 310 before a trust center and obtain:

each second encryption key, $SEK_1$-$SEK_n$, used by each data provider $DP_1$-$DP_n$; and the third encryption key, TEK.

The module 312 provides authentication data, such as an authentication certificate or token, to the trust center for authenticating said intermediary 310. Once the intermediary is authenticated and identified as the intermediary, the keys $SEK_1$-$SEK_n$ and the key TEK are transmitted to said intermediary 310. According to a non-limitative example, the module 312 is configured/programmed to carry out the optional step 212 of method 200.

The system 300 comprises in the environment of, or at the level of, the intermediary 310, an encryption/decryption module 314 for applying the following operations to each dataset received from each data provider $DP_i$:

first, decrypting, with the $SEK_i$ specific to said data provider $DP_i$, each variable of said dataset previously encrypted with said $SEK_i$; and then, encrypting each confidential variable of said dataset (variable already encrypted with the FEK) with the TEK.

According to a non-limitative example, the module 314 is configured/programmed to carry out steps 214-216 of the method 200, according to one or more embodiments of the invention.

Each dataset with variables encrypted with the TEK is ready to be communicated to the analysis environment.

The system 300 further comprises a trust center 320.

The system 300 comprises, in the environment of, or at the level of, the trust center 300, an authentication module 322 for receiving an authentication request, and carrying out an authentication process, for authenticating each data provider $DP_1$-$DP_2$ and the intermediary.

The system 300 comprises, in the environment of, or at the level of, the trust center 300, a module 324 for generating the encryption keys, i.e. the FEK, the $SEK_1$-$SEK_n$ and the TEK.

The system 300 may optionally comprise an analysis environment 330 for analyzing data provided by each data provider $Dp_1$-$DP_n$.

The system 300 may comprise at the level of, or in the environment of, the analysis environment 330, an optional gathering module 332 for gathering datasets relating to the same entity together. The gathering module 332 may realize gathering datasets based on exact matching technique, or based on a similarity-based technique, as described above. According to a non-limitative example, the gathering module 332 is configured/programmed to carry out the gathering step 230 of method 200, according to one or more embodiments of the invention.

The system 300 may comprise at the level of, or in the environment of, the analysis environment 330, an optional module 334 for organizing datasets as graph database. According to a non-limitative example, the module 334 is configured/programmed to carry out the optional step 220 of method 200, according to one or more embodiments of the invention.

The system 300 may comprise at the level of, or in the environment of, the analysis environment 330, an optional data enrichment module 336 for enriching data. According to a non-limitative example, the enrichment module 336 is configured/programmed to carry out the enrichment step 240 of method 200, according to one or more embodiments of the invention.

The system 300 may comprise at the level of, or in the environment of, the analysis environment 330, at least one data analysis module 338 for analyzing data. According to a non-limitative example, the at least one data analysis module 338 is configured/programmed to carry out the analysis step 250 of method 200, according to one or more embodiments of the invention.

The system 300 may comprise at the level of, or in the environment of, the analysis environment 330, an optional analysis report generation module 340 for generating one or several reports comprising at least the results of the data analysis. According to a non-limitative example, the report generation module 340 is configured/programmed to carry out the step 252 of method 200, according to one or more embodiments of the invention.

At least one of the modules $302_1$-$302_n$, $304_1$-$304_n$, $306_1$-$306_n$, 312, 314, 322, 324, 332-340 may be a hardware unit, such as a processor, a computer, a server, etc.

At least one of said modules may be a software unit, such as a computer program, a virtual machine, etc, according to one or more embodiments of the invention.

At least one of said modules may be a combination of at least one hardware unit and a software unit, according to one or more embodiments of the invention.

At least two of said modules located in the same environment may be an individual module, independent from the other module(s) located in the same environment, according to one or more embodiments of the invention.

At least two of said modules located in the same environment may be combined in a one and single module, according to one or more embodiments of the invention.

Of course, the one or more embodiments of the invention are not limited to the examples detailed above for illustration purposes.

What is claimed is:

1. A computer implemented method for collecting datasets from several data providers, for joint analysis of all datasets in an analysis environment, each dataset of said datasets comprising several variables relating to an entity, at least one variable of said several variables being confidential variables, said computer implemented method comprising:

for said each dataset originating from each data provider of said several data providers, encrypting each confidential variable of said confidential variables in said each dataset with a first encryption key common to all data providers of said several data providers, to form a first encrypted dataset, and encrypting said each confidential variable of the first encrypted dataset with a second encryption key specific to said each data provider and shared with an intermediary, to form a double encrypted dataset encrypted with the first encryption key and the second encryption key;

transmission of the double encrypted dataset obtained after the encrypting with said second encryption key to said intermediary;

at said intermediary, for said double encrypted dataset that is received, decrypting said each confidential variable previously encrypted with said second encryption key, such that the confidential variables are still encrypted with the first encryption key, and encrypting said each confidential variable still encrypted with the first encryption key with a third encryption key to form a double encrypted dataset encrypted with the first encryption key and the third encryption key; and transmission of said each dataset of said datasets comprising the double encrypted dataset encrypted with the first encryption key and the third encryption key to the analysis environment for data analysis.

2. The computer implemented method according to claim 1, further comprising, at the analysis environment, gathering datasets relating to a same entity, based on at least one variable in said each dataset.

3. The computer implemented method according to claim 2, wherein at the analysis environment, the gathering comprises identifying datasets relating to the same entity based on an exact matching of at least one identity variable in said datasets.

4. The computer implemented method according to claim 2, wherein at the analysis environment, the gathering comprises identifying datasets relating to the same entity based on a similarity score between said datasets.

5. The computer implemented method according to claim 4, further comprising calculating a similarity score between two datasets of said datasets, based on at least one identity variable in said datasets.

6. The computer implemented method according to claim 1, wherein the first encryption key is a multiple use key.

7. The computer implemented method according to claim 1, wherein the second encryption key of at least one data provider of said several data providers is a single use key.

8. The computer implemented method according to claim 1, wherein the third encryption key is a multiple use key.

9. The computer implemented method according to claim 1, wherein each encryption key of said first encryption key, said second encryption key and said third encryption key is generated and provided by a trust center.

10. The computer implemented method according to claim 1, further comprising, at the analysis environment, representing said datasets in a graph database in which each node of said graph database represents an entity.

11. The computer implemented method according to claim 1, further comprising, at the analysis environment, enriching data of said datasets with at least one predetermined algorithm, said at least one predetermined algorithm comprising one or more of a centrality algorithm for providing an importance score to an entity, or an attribute, a community algorithm for providing an information regarding one or more of clusters, neighborhood and attributes of entities, a graph embedding analysis algorithm for providing properties of an entity.

12. The computer implemented method according to claim 1, further comprising analyzing, in the analysis environment, the datasets with at least one analysis module.

13. A non-transitory computer program comprising instructions which, when executed by a computer, cause said computer to carry out a computer implemented method for collecting datasets from several data providers, for joint analysis of all datasets in an analysis environment, each dataset of said datasets comprising several variables relating to an entity, at least one variable of said several variables being confidential variables, said computer implemented method comprising for said each dataset originating from each data provider of said several data providers, encrypting each confidential variable of said confidential variables in said each dataset with a first encryption key common to all data providers of said several data providers, to form a first encrypted dataset, and encrypting said each confidential variable of the first encrypted dataset with a second encryption key specific to said each data provider and shared with an intermediary, to form a double encrypted dataset encrypted with the first encryption key and the second encryption key;

transmission of the double encrypted dataset obtained after the encrypting with said second encryption key to said intermediary;

at said intermediary, for said double encrypted dataset that is received, decrypting said each confidential variable previously encrypted with said second encryption key, such that the confidential variables are still encrypted with the first encryption key, and encrypting said each confidential variable still encrypted with the first encryption key with a third encryption key to form a double encrypted dataset encrypted with the first encryption key and the third encryption key; and transmission of said each dataset of said datasets comprising the double encrypted dataset encrypted with the first encryption key and the third encryption key to the analysis environment for data analysis.

14. A system that carried out a computer implemented method for collecting datasets from several data providers, for joint analysis of all datasets in an analysis environment, each dataset of said datasets comprising several variables relating to an entity, at least one variable said several variables being confidential variables, said system comprising:

for said each dataset originating from each data provider of said several data providers, an encryption/decryption module that encrypts each confidential variable of said confidential variables in said each dataset with a first encryption key common to all data providers of said several data providers, to form a first encrypted dataset, and encrypting said each confidential variable of said first encrypted dataset with a second encryption key specific to said each data provider and shared with an intermediary, to form a double encrypted dataset encrypted with the first encryption key and the second encryption key;

communication means configured to transmit the double encrypted dataset obtained after the encrypting with the second encryption key to said intermediary;

at said intermediary, for said double encrypted dataset that is received, an encryption/decryption module that carries out decrypting said each confidential variable previously encrypted with said second encryption key, such that the confidential variables are still encrypted with the first encryption key, and encrypting said each confidential variable still encrypted with the first encryption key with a third encryption key to form a double encrypted dataset encrypted with the first encryption key and the third encryption key; and wherein said communication means is further configured to transmit said each dataset of said datasets comprising the double encrypted dataset encrypted with the first encryption key and the third encryption key to the analysis environment for data analysis.

\* \* \* \* \*